(12) United States Patent
Chhabra et al.

(10) Patent No.: US 10,514,868 B2
(45) Date of Patent: Dec. 24, 2019

(54) DEVICE REGISTRATION TO FLEET SERVICE USING GATEWAY FEATURE

(71) Applicant: KYOCERA Document Solutions Inc., Osaka (JP)

(72) Inventors: Ankur Chhabra, Pleasanton, CA (US); Hongyi Zhang, Martinez, CA (US); Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 331 days.

(21) Appl. No.: 15/665,176

(22) Filed: Jul. 31, 2017

(65) Prior Publication Data

US 2019/0034127 A1 Jan. 31, 2019

(51) Int. Cl.
*G06F 3/12* (2006.01)
*H04L 29/12* (2006.01)
(Continued)

(52) U.S. Cl.
CPC ............ *G06F 3/1203* (2013.01); *G06F 3/121* (2013.01); *G06F 3/123* (2013.01); *G06F 3/1211* (2013.01); *G06F 3/1224* (2013.01); *G06F 3/1229* (2013.01); *G06F 3/1288* (2013.01); *G06F 11/30* (2013.01); *H04L 41/04* (2013.01); *H04L 41/044* (2013.01); *H04L 41/046* (2013.01);
(Continued)

(58) Field of Classification Search
CPC ...... G06F 3/1203; G06F 3/121; G06F 3/1211; G06F 3/1224; G06F 3/1229; G06F 3/123; G06F 3/1231; G06F 3/1259; G06F 3/1288; G06F 3/1291; G06F 3/1293–1294; G06F 11/30–3006; G06F 11/3055; G06F 11/3065–3075; H04L 29/08099; H04L 41/04–046; H04L 41/0813; H04L 41/12; H04L 43/00; H04L 43/04; H04L 61/1541; H04L 67/025; H04L 67/28
See application file for complete search history.

(56) References Cited

U.S. PATENT DOCUMENTS 6,055,240 A * 4/2000 Tunnicliffe ............. H04L 29/06
370/230
6,532,491 B1 * 3/2003 Lakis .................. H04L 41/0213
709/223
(Continued)

*Primary Examiner* — Brendan Y Higa
(74) *Attorney, Agent, or Firm* — McDonnell Boehnen Hulbert & Berghoff LLP

(57) ABSTRACT

Methods and apparatus for utilizing a network device manager (NDM) as an agent for printing devices are provided. An NDM executing on a computing device can be registered as a. as a maintenance agent for a plurality of printing devices. The NDM can be utilized as the maintenance agent for the plurality of printing devices by: receiving inputs related to modifying data at the NDM; receiving data from the plurality of printing devices at the NDM; modifying the data received from the plurality of printing devices based on the inputs related to modifying data using the NDM; sending the modified data from the NDM to a device management system; after sending the modified data, receiving, at the NDM from the device management system, one or more maintenance messages related to maintenance of the plurality of printing devices; and providing a notification of the one or more maintenance messages.

20 Claims, 13 Drawing Sheets

(51) Int. Cl.
*H04L 12/24* (2006.01)
*G06F 11/30* (2006.01)

(52) U.S. Cl.
CPC ...... *H04L 41/0813* (2013.01); *H04L 61/1541* (2013.01); *H04L 41/12* (2013.01)

(56) References Cited

U.S. PATENT DOCUMENTS

| | | | |
|---|---|---|---|
| 9,582,225 B2* | 2/2017 | Osadchyy | G06F 3/1205 |
| 2003/0009543 A1* | 1/2003 | Gupta | H04L 41/0213 |
| | | | 709/223 |
| 2013/0208302 A1* | 8/2013 | Tanaka | H04N 1/00228 |
| | | | 358/1.15 |
| 2014/0240739 A1* | 8/2014 | Hattori | G06F 3/1219 |
| | | | 358/1.13 |
| 2014/0268226 A1* | 9/2014 | Yoshida | G06F 11/0733 |
| | | | 358/1.15 |
| 2016/0139994 A1* | 5/2016 | Matsumoto | G06F 11/1417 |
| | | | 714/15 |
| 2016/0219102 A1* | 7/2016 | Nakajima | H04L 41/28 |
| 2016/0366292 A1 | 12/2016 | Anezaki et al. | |
| 2017/0019552 A1* | 1/2017 | Nakamura | H04N 1/0097 |
| 2017/0153856 A1* | 6/2017 | Kaneko | G06F 3/1209 |
| 2017/0201635 A1* | 7/2017 | Takamoto | H04L 43/0876 |
| 2018/0060094 A1* | 3/2018 | Tsuji | H04N 1/00416 |

* cited by examiner

User Interface
(UI) 700

Display 710

Gateway Agent Registration

Gateway / Agent Information

Agent Path / URL 720 [        ]   Gateway ID 722 xxxxxxx

Agent Authentication

Access Code 724 [        ]

Description 726 [        ]

☒ Require Manager Authentication 730

Manager User Name 732 [        ]

Manager Password 734 [        ]

| Register 736 | Unregister 738 | Cancel 740 |

Display 750

Gateway Agent Proxy Data

☒ Use Proxy 760

Host Name 770 [        ]

Port 772 [ 11111 ]

Proxy Username 774 [        ]

Proxy Password 776 [        ]

| Save 780 | Delete 782 | Cancel 784 |

FIG. 7

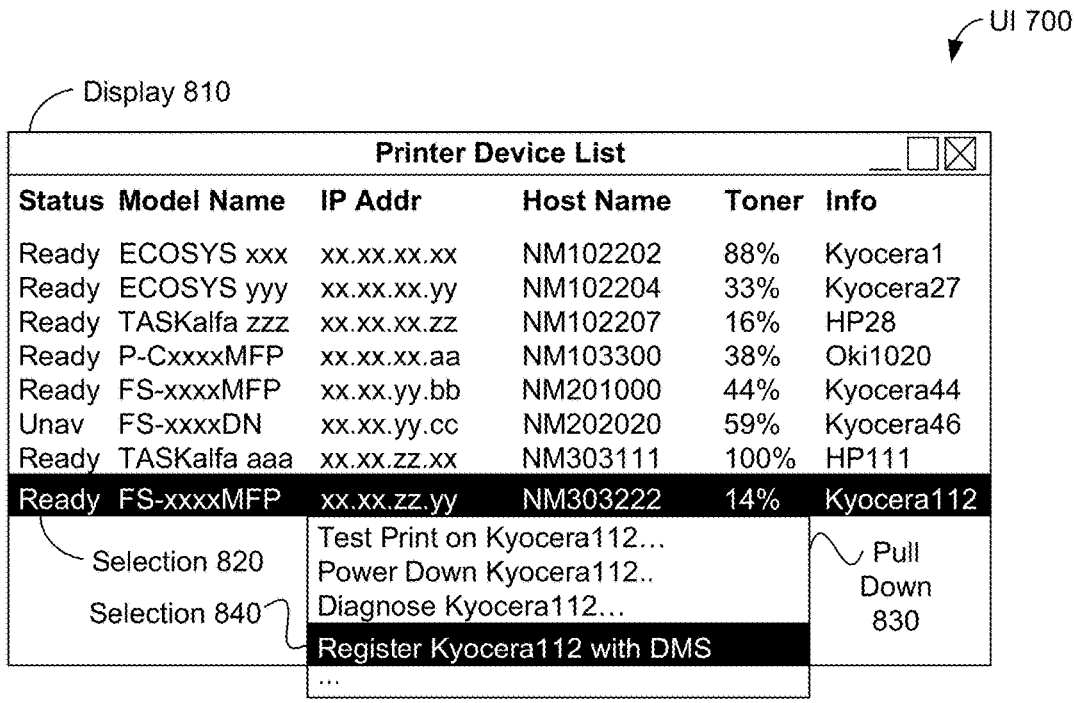
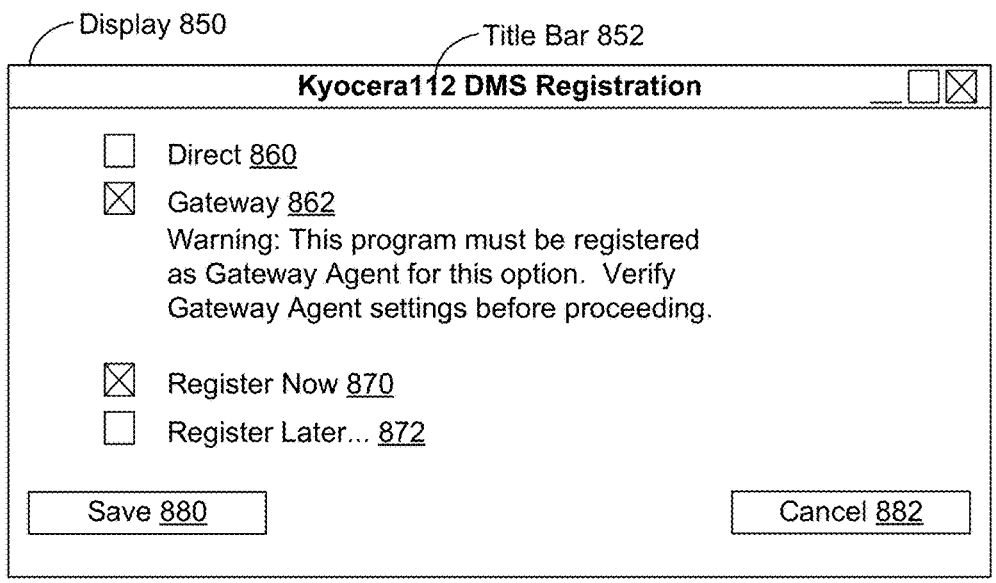
FIG. 8

UI 700

Display 910 — Sort Indicator 912

DMS Task Management Display

| Task | Device | Time ▼ | Info |
|---|---|---|---|
| FW Upgrade | Kyocera1 | Mon 06:00 | Engine, Scanner |
| FW Upgrade | Kyocera44 | Mon 06:00 | Security |
| Diagnose | Kyocera27 | Mon 13:30 | Paper jams frequently... |

Generate New DMS Task... 920

Exit 922

Display 950

Generate a New DMS Task

Device Name(s) 960 — Kyocera27

Task 970 — FW Upgrade ▼
FW Upgrade
Diagnose
Other (see Desc.)

Pull Down 972

Description 980

Send Task 990

Cancel 992

─ Display 1010

DMS Printer Configuration

Printer Configuration Data

| Device Name 1020 | Kyocera27 |
| Manufacturer 1022 | Kyocera |
| Model 1024 | xxxx |
| Year 1026 | 2017 |
| Firmware Version 1028 | FWxxxxxx |

Components 1030  ☒ Printer Engine  ☐ Copier
                 ☒ Scanner         ☐ Finisher Save 1040                                    Cancel 1042

─ Display 1050

DMS Task Configuration

Task Configuration Data

Automatically accept firmware upgrades for... 1060
☐ Printer Engine  ☐ Copier
☐ Scanner         ☐ Finisher
☒ Security        ☐ Accept all upgrades Automatic Task Acceptance Times 1070

| Monday | 0000-0559, 2200-2359 |
| Tuesday | 0000-0559, 2200-2359 |
| Wednesday | 0000-0559, 2200-2359 |
| Thursday | 0000-0559, 2200-2359 |
| Friday | 0000-0559, 2200-2359 |
| Saturday | none |
| Sunday | none |

☐ Automatically reject tasks outside of task acceptance times 1072

Save 1080                                    Cancel 1082

FIG. 10

1210 Register a network device manager (NDM) executing on a computing device as a maintenance agent for a plurality of printing devices

1220 Utilize the NDM as the maintenance agent for the plurality of printing devices by:
- Receiving inputs related to modifying data at the NDM
- Receiving data from the plurality of printing devices at the NDM
- Modifying the data received from the plurality of printing devices based on the inputs related to modifying data using the NDM
- Sending the modified data from the NDM to a device management system
- After sending the modified data, receiving, at the NDM from the device management system, one or more maintenance messages related to maintenance of the plurality of printing devices
- Providing a notification of the one or more maintenance messages

FIG. 12

DEVICE REGISTRATION TO FLEET SERVICE USING GATEWAY FEATURE

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can use various types of colorant to print on paper or other media. These types of colorant can include toner, inks, and dyes. These colorants can be of various colors; e.g., black, cyan, magenta, yellow. Typically, colorant for a printing device can be replaced or refilled. For example, toner of one or more colors can be replaced in many modern laser printers.

SUMMARY

In one aspect, a method is provided. A network device manager (NDM) executing on a computing device is registered as a maintenance agent for a plurality of printing devices. The NDM is utilized as the maintenance agent for the plurality of printing devices by: receiving inputs related to modifying data at the NDM; receiving data from the plurality of printing devices at the NDM; modifying the data received from the plurality of printing devices based on the inputs related to modifying data using the NDM; sending the modified data from the NDM to a device management system; after sending the modified data, receiving, at the NDM from the device management system, one or more maintenance messages related to maintenance of the plurality of printing devices; and providing a notification of the one or more maintenance messages.

In another aspect, a system is provided. The system includes: a device management system; a plurality of printing devices; and a network device manager (NDM). The NDM includes one or more processors; and data storage configured to store computer-readable instructions that, when executed by the one or more processors, cause the computing device to perform tasks. The tasks include: registering as a maintenance agent for the plurality of printing devices with the device management system; and utilizing the NDM as the maintenance agent for the plurality of printing devices by: receiving inputs related to modifying data at the NDM; receiving data from the plurality of printing devices at the NDM; modifying the data received from the plurality of printing devices based on the inputs related to modifying data using the NDM; sending the modified data from the NDM to the device management system; after sending the modified data, receiving, at the NDM from the device management system, one or more maintenance messages related to maintenance of the plurality of printing devices; and providing a notification of the one or more maintenance messages.

In another aspect, an article of manufacture is provided. The article of manufacture includes non-transitory data storage storing at least computer-readable instructions for a network device manager (NDM) that, when executed by one or more processors of a computing device, cause the computing device to perform tasks. The tasks include: registering as a maintenance agent for a plurality of printing devices with a device management system; and utilizing the NDM as the maintenance agent for the plurality of printing devices by: receiving inputs related to modifying data at the NDM; receiving data from the plurality of printing devices at the NDM; modifying the data received from the plurality of printing devices based on the inputs related to modifying data using the NDM; sending the modified data from the NDM to the device management system; after sending the modified data, receiving, at the NDM from the device management system, one or more maintenance messages related to maintenance of the plurality of printing devices; and providing a notification of the one or more maintenance messages.

Other aspects, embodiments, and implementations will become apparent to those of ordinary skill in the art by reading the following detailed description, with reference where appropriate to the accompanying drawings.

BRIEF DESCRIPTION OF THE FIGURES

FIGS. 7, 8, 9, 10, and 11 show displays of a user interface related to a network device manager and a device management service.

FIG. 12 shows a flowchart for another method, according to an example embodiment.

DETAILED DESCRIPTION

Figure 1A:
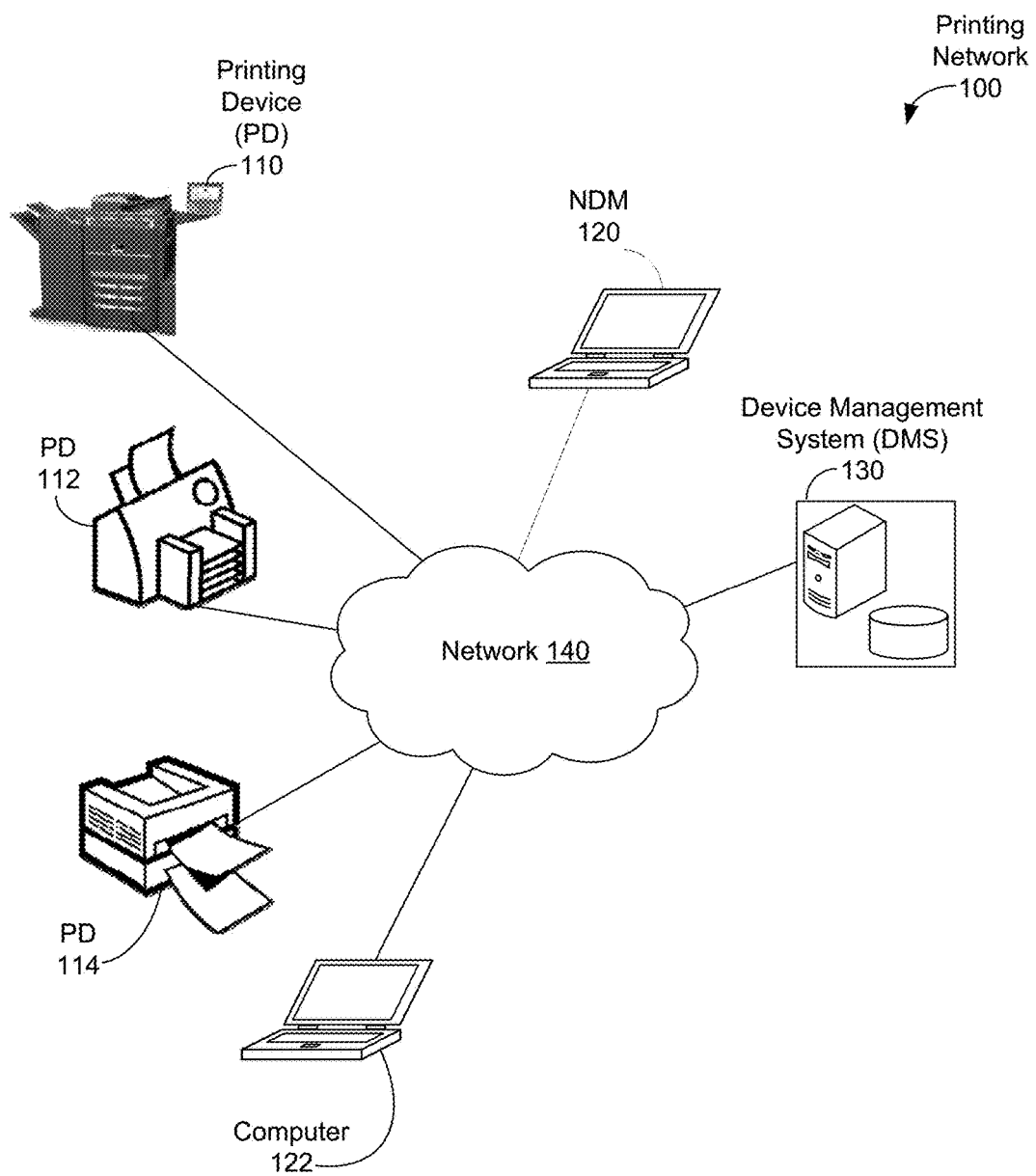
FIG. 1A is a diagram illustrating a printing network, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Herein are described techniques and systems for utilizing a network device manager (NDM), which can include software executing on a computing device, as an agent for printing devices. The NDM can be used to coordinate and manage communications and maintenance and management operations between printing devices and a device management system. In some examples, the NDM and the printing devices can be connected via a local network, the NDM and the device management system can be connected by a global network, and the NDM can be a primary, or even the only, connection between the local and global networks for maintenance purposes. As such, the NDM can be used to provide access and filter communications between the printing devices and the device management system.

The NDM, device management system, and printing devices can be utilized by maintenance personnel at various locations. Information Technology (IT) staff, such as IT administrators, can utilize the NDM to manage printing devices, the local network, and coordinate activities with a service team of service personnel utilizing the device management system. In particular, the IT staff can use the NDM to register the NDM to act as a maintenance agent for one or more printing devices in the local network. In its role of a maintenance agent, the NDM can be used as a maintenance gateway to the local network so that each printing device does not have to be registered and directly communicate with the device management system, reducing registration overhead and communication bandwidth between the local and global network expended to manage printing devices.

The service team can perform remote maintenance activities using the device management system and the NDM, where the NDM can act a maintenance agent for registered printing devices. For example, the service team can receive firmware for one or more printers of a particular entity, and for this example, the printers are registered to utilize the NDM as a maintenance agent. The service team can use the NDM to coordinate communications in the local network with the device management system, to coordinate and approve firmware installation details (e.g., specific firmware downloads, times, and printing devices for downloaded software) with IT staff, and to install approved firmware on the printing devices.

In some examples, the maintenance agent functionality can be added to an existing NDM that already includes functionality for managing printing devices. Then, the NDM can be a "one stop shop" where IT staff can use to manage printing devices locally and can use the NDM as a maintenance agent to perform and coordinate maintenance and management operations along with the device management system and related service personnel of the service team. Using the existing NDM for both locally managing printing devices and for managing the printing devices using data available from the global network reduces training and resources required to use and learn new maintenance tools.

In some examples, a registered printing device can provide usage data, such as printer counter data, and perhaps other data to the device management system in the global network via the NDM. Then, registered printing devices can be synchronized with the device management system so that the device management system can track consumable related data and other information about the printing devices as provided in the usage data. In this role, the NDM can authorize transmission of usage data and perhaps modify the usage data provided from the printing devices to the device management system. The usage and/or other data provided to the device management system can be modified by the NDM as directed by a user of the NDM for security, privacy, consistency, and/or other reasons.

The NDM can be used to request maintenance and management operations for registered printing devices to be performed in coordination with the device management system and the service team. Examples of these maintenance and management operations include, but are not limited to: an operation related to a firmware upgrade for a particular printing device, an operation related to configuring one or more device and/or system settings for one or more printing devices, an operation related to a security certificate, an operation related to restarting the particular printing device, an operation related to powering on the particular printing device, an operation related to powering off the particular printing device, an operation related to managing an address book related to the particular printing device, an operation related to managing one or more user accounts of the particular printing device, an operation utilizing a display panel of the particular printing device, an operation related one or more software extensions and/or applications related to the particular printing device, an operation related to communicating data with the particular printing device, and an operation related to registering the particular printing device for maintenance services. Examples of the device and/or system settings include, but are not limited to, settings for: a language related to one or more printing device, a time related to one or more printing devices, energy saving settings for related one or more printing devices, printing, scanning, and/or copying (e.g., scan resolution, zoom, format, print resolution, eco-mode, collate, staple, offset related settings), network settings (e.g., Internet Protocol address format (IPv4/6), IP hostname, IP filters, network naming settings, Lightweight Directory Access Protocol (LDAP) authentication, Simple Mail Transfer Protocol (SMTP) server settings, Secure Sockets Layer (SSL) settings, security settings, protocol-related settings), and communication related settings for electronic communications (e.g., names, contact lists, e-mail names/lists, phone and/or facsimile numbers, File Transfer Protocol (FTP)-related information, information about shared files, folders, storage, etc.).

Once the NDM is registered as a maintenance agent for a particular printing device, IT staff can use the NDM to send a request to the service team to perform a remote maintenance activity, such as, but not limited to, remote execution of one or more of the above-mentioned maintenance and management operations. The service team can schedule a time to perform the remote maintenance activity with the IT staff via messaging performed by the NDM. In particular, IT staff can review a task associated with a remote maintenance activity and subsequently approve, modify, or cancel performance of the task.

The NDM can support differing amounts of integration between the NDM/local network and the device management system/global network. That is, entities that are not comfortable to register their devices in the global network can also make use of integration between the NDM and the device management system. For example, an entity can register the NDM as a maintenance agent for a printing device. Then, to schedule a remote maintenance activity for the registered printing device using information from the global network, the NDM can post a request to the device management system with a relatively-small amount of information about the registered printing device. Upon reception of the request, the device management system can create a locally-executable task to carry out the requested remote maintenance activity based on the information provided about the requested activity and the registered printing device. Upon reception of the locally-executable task, IT staff can execute the locally-executable task regarding the registered printing device. That is, the registered printing device was not registered in device management system/ global network, but the requested remote maintenance activity was provided by the device management system as a locally-executable task for IT staff to carry out in the local network for the registered printing device.

In some examples, the device management system and/or the global network can provide additional computing power and storage that can be used to provide information related to management of registered printing devices. For example, the device management system and/or the global network can provide reports involving historical data, trends and/or predictions, where generation of these reports can involve a large amount of computing power and/or storage. Other examples are possible as well.

The herein-described techniques can enable the use of one local tool—the NDM—to manage printing devices locally while enabling coordination of remote management activities with a global network and associated service team operating on printing devices registered to use the NDM as a maintenance agent. Further, the NDM can be used to control an amount and types of data shared about registered printing devices with the device management system, service team, and global network. Using the NDM as a gateway between local and global networks minimizes a number of connections between networks and so can simplify communications between these networks. Further, by providing a platform to coordinate remote management activities, the NDM enhances task-related interactions between IT staff and the service team and enables the IT staff to ensure these task-related interactions are conduct in accord with existing security policies related to external access to local networks.

II. Printing System Examples

FIG. 1A is a diagram illustrating printing network 100, according to an example embodiment. Printing network 100 includes printing devices (PDs) 110, 112, 114, computing device 120 acting as a NDM (hereinafter termed NDM 120), computer 122, and a server computing device acting as a device management system (DMS) 130 interconnected using network 140. In some examples, printing network 100 can have more, fewer, and/or different types of computing devices, servers, and/or printing devices than indicated in FIG. 1A.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PAPERD or electronic document ED by at least: creating an electronic document ED1 representing the contents of PAPERD (e.g., scan PAPERD to create ED1), making one or more paper copies of PAPERD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In an example embodiment, some or all printing devices 110, 112, 114 can be connected to network 140 through one or more, possibly different, network protocols. Data can be transmitted between printing devices 110, 112, 114, NDM 120, computer 122, and device management system 130 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: NDM 120, computer 122, and device management system 130 sending data for print jobs and/or print job portions for printing to printing devices 110, 112, 114 and printing devices 110, 112, 114 sending alert, status, error, device information, colorant-usage information, maintenance-event information, and/or other messages to NDM 120, computer 122, and device management system 130 to inform other devices about colorant-usage, maintenance, error, and/or other conditions of the printing devices; e.g., idle, printing, sleeping, paper jam, low or out of paper, low or out of toner/ink, etc. Other communications between NDM 120, computer 122, and device management system 130 and/or product information servers/databases 134, such as, but not limited to, communications related to one or more maintenance and management operations, are possible as well.

NDM 120 and/or computer 122 can create, obtain, update, display, and/or delete data (and perhaps related software) for configurations of printing network 100. Example data for configurations of printing network 100 includes, but is not limited to: data for configuring devices in printing network 100; e.g., data for printing devices 110, 112, 114, data for configuring network protocols (e.g., FTP, HTTP, KPDL™, PCT, PDF, SOAP, SMS™, SMTP, SNMP, TCP/IP, UDP, LDAP, MQ, and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing networks 100 and/or 150. In particular, NDM 120 and/or computer 122 can provide displays related to maintaining printing devices, including displays related to colorant usage for printing devices and/or predictions related to colorant usage, where the printing devices can include but are not limited to printing devices 110, 112, 114.

Device management system 130 can be used to perform one or more remote maintenance activities for one or more printing devices 110, 112, 114. The one or more remote maintenance activities can include, but are not limited to, one or more maintenance and management operations. In some examples, device management system 130 and NDM 120 can cooperate to perform the one or more remote maintenance activities. For example, NDM 120 can be registered as a maintenance agent for one or more of printing devices 110, 112, 114, and can therefore be used to schedule, coordinate, and execute the remote maintenance activities for registered printing devices with device management system 130. In other examples, device management system 130 and NDM 120 can communicate data, reports, and other information about printing devices registered with the NDM. Data provided by registered printing devices, such as usage data/counters, can be modified by NDM 120 before being sent to device management system 130 to make the data more uniform, to anonymize the data, to restrict data flows, and/or otherwise modify the data as discussed herein.

In some embodiments, one or more additional computing devices, e.g., one or more servers and/or computing devices, can be used in printing network 100 to perform additional functions, such as functions for one or more document solutions and managed print services, prediction-related functions, act as databases, provide machine learning functionality, and other functions. In other embodiments, NDM 120, computer 122, and/or device management system 130 can provide some or all of these additional functions along with their herein-described functionality. For example, one or more of NDM 120, computer 122, and device management system 130 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 140. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, and perhaps other data.

Figure 1B:
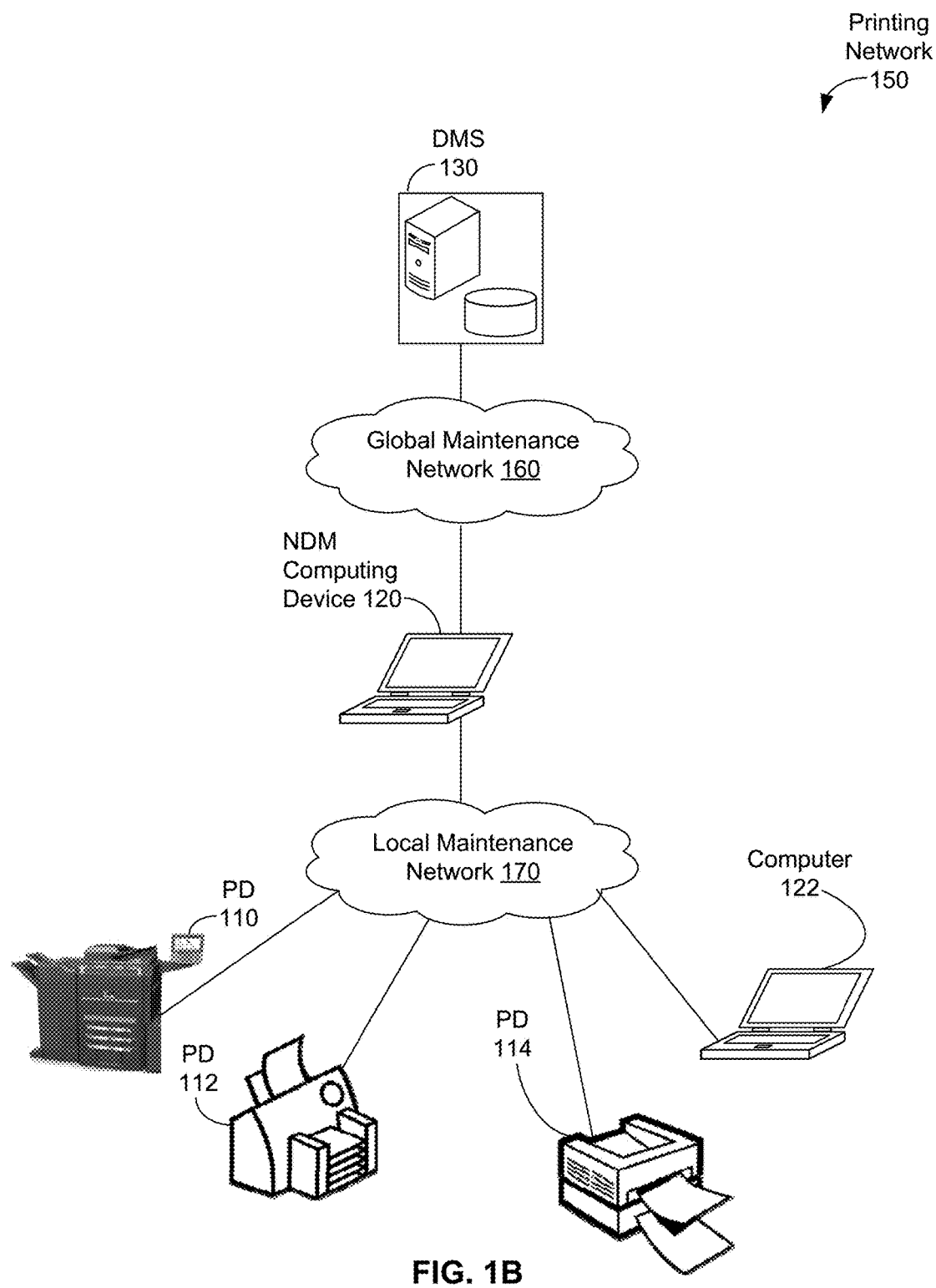
FIG. 1B is a diagram illustrating another printing network, according to an example embodiment.

FIG. 1B is a diagram illustrating another printing network 150, according to an example embodiment. Printing network 150 can include printing devices 110, 112, 114, computer 122, NDM 120, and device management system 130, and perform the functions of printing network 100 discussed above in the context of FIG. 1A. In FIG. 1B, however, network 140 of printing network 100 is shown divided into networks 160, 170 connected by NDM 120 for printing network 150.

In printing network 150, at least communications related to remote maintenance activities and maintenance and management operations between printing devices 110, 112, 114 and/or computer 122 in local maintenance network 170 and device management system 130 in global maintenance network 160 can be routed through NDM 120. In particular, NDM 120 can register as a maintenance agent for printing (and perhaps other) devices in local maintenance network 170. Then, NDM 120 can communicate information about registered printing (and perhaps other) devices in local maintenance network 170 with devices in global maintenance network 160, such as device management system 130. For example, communications from global maintenance network 160 related to remote maintenance activities and maintenance and management operations involving registered devices in local maintenance network 170 can be routed through NDM 120. As such, NDM 120 can act as a gateway device for remote maintenance activities and maintenance and management operations between registered devices in local maintenance network 170 and devices in global maintenance network 160.

Utilizing NDM 120 as a gateway device can reduce the number of devices registered and/or communicating directly with device management system 130, reducing both bandwidth and data utilized by device management system. In some examples, NDM 120 can amalgamate communications related to several devices in local maintenance network 170 into a smaller number and amount of communications (perhaps one)—for example, several task requests related to remote management activities for individual devices in network 170 can be amalgamated into one common task request for all of these devices.

Further, network addresses, device names, and/or other information about devices in local maintenance network 170 that would have to be provided to register with device management system 130 can be hidden, anonymized, and/or otherwise modified by NDM 120, thus providing additional security for devices in local maintenance network 170. Also, utilizing NDM 120 as a gateway device can lead to fewer points of contact between networks 160 and 170, thus easing any tasks involving localizing faults and/or security breaches occurring between networks 160 and 170.

In some examples, device management system 130 cannot communicate with printing and/or other devices in local maintenance network 170 directly; rather, device management system 130 can communicate with NDM 120 via global maintenance network 160 and NDM 120 can communicate with printing and/or other devices in local maintenance network 170 on behalf of device management system 130. In these examples, a printing (or other) device in local maintenance network 170 cannot communicate with device management system 130 and/or other devices in global maintenance network 160 directly; rather, a registered printing (or other) device in local maintenance network 170 can communicate with NDM 120 via local maintenance network 170 and NDM 120 can communicate with device management system 130 via global maintenance network 160 on behalf of the printing (or other) device in local maintenance network 170. As such, NDM 120 can act as a maintenance agent in local maintenance network 170 on behalf of device management system 130 and/or NDM 120 can act as a maintenance agent in global maintenance network 160 on behalf of registered printing (and other) devices in local maintenance network 170.

Figure 2:
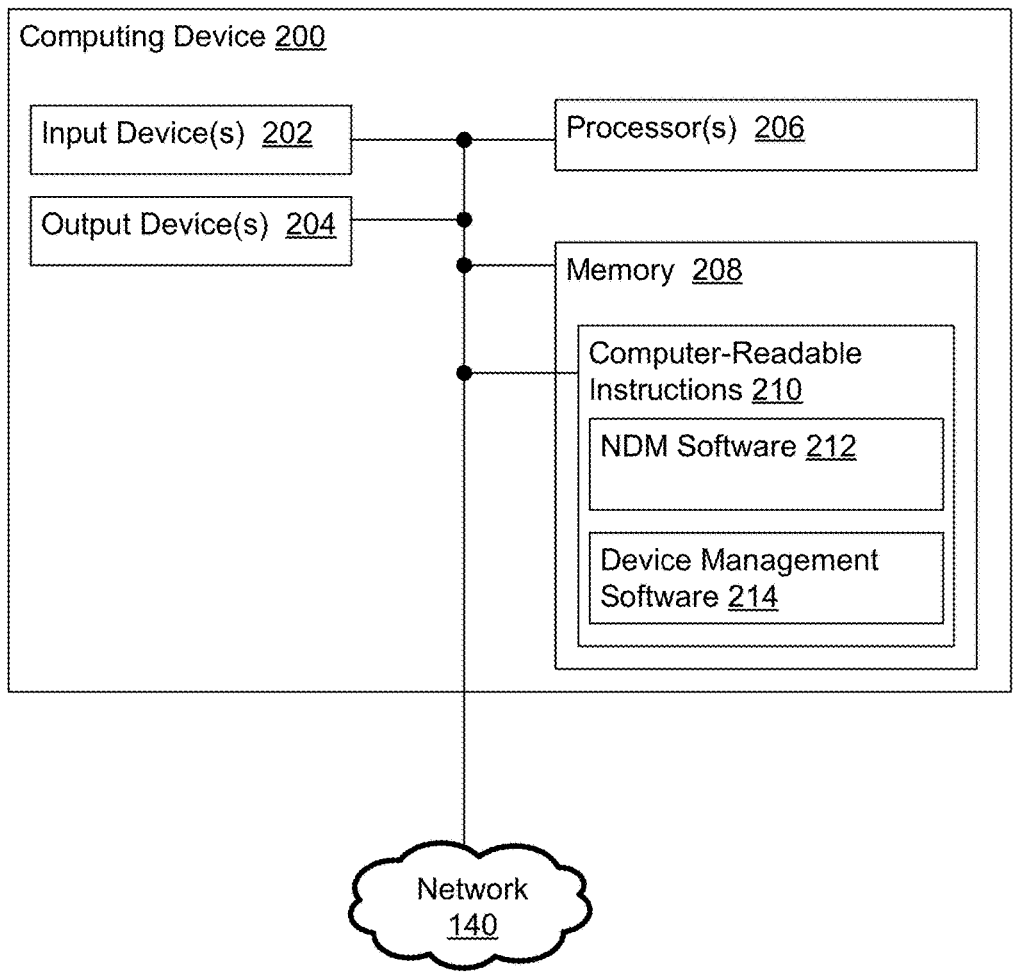
FIG. 2 is a schematic block diagram illustrating a computing device, according to an example embodiment.

FIG. 2 is a schematic block diagram illustrating computing device 200, according to an example embodiment. In some embodiments, computing device 200 can be configured at least to perform one or more herein-described functions of: printing networks 100, 150, printing devices 110, 112, 114, NDM 120, computer 122, device management system 130 networks 140, 160, 170, user interface 700 including displays 710, 750, 810, 850, 910, 950, 1010, 1050, 1110, and methods 600, 1200, as well as part of or the entire herein-described functionality related to the graphs shown in FIGS. 4A-9 and/or scenario 300.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 160, 170 and/or wireless network receivers and/or transceivers, such as a Bluetooth® transceiver, a Zigbee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 160, 170. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 160, 170, and/or wireless network transmitters and/or transceivers, such as a Bluetooth® transceiver, a Zigbee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 160, 170. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, functions of herein-described devices, networks, methods, features, and scenarios. In some embodiments, computer-readable instructions 210 can include instructions that, when executed, can perform part or the entire herein-described functionality of an NDM and/or a device management system.

In some embodiments, computer-readable instructions 210 can include at least instructions for NDM software 212 and/or device management software 214. NDM software 212, when executed by processors 206 of computing device 200, provides instructions to computing device 200 to perform at least some of the herein-described functions of an NDM, carry out part or all of method 600 and/or method 1200, and/or provide some or all of the functionality described with respect to user interface 700. Device management software 214, when executed by processors 206 of computing device 200, provides instructions to computing device 200 to perform at least some of the herein-described functions of a device management system.

III. Techniques for Utilizing an NDM as a Maintenance Agent

Figure 3:
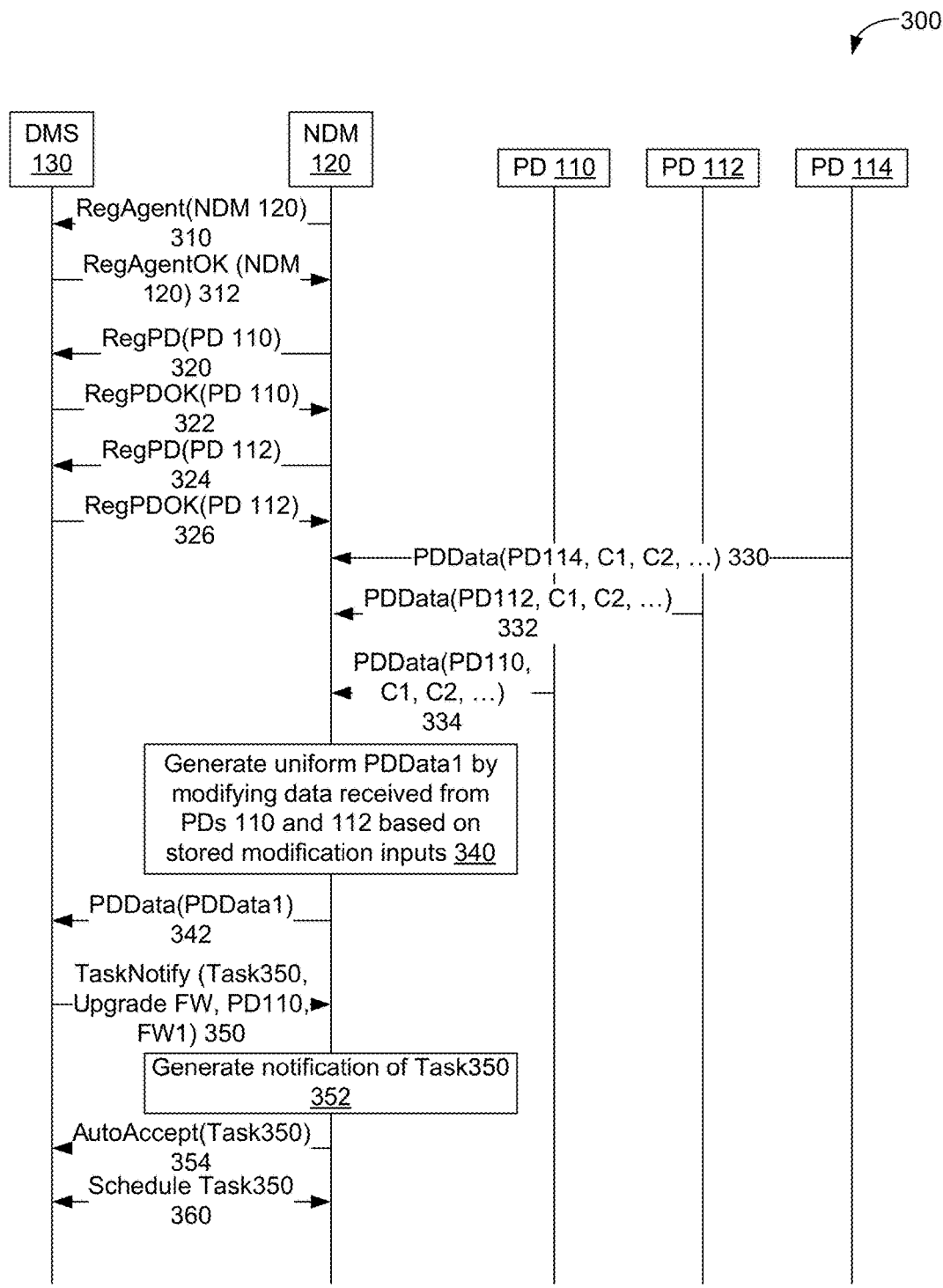
FIGS. 3, 4, and 5 illustrate communications of a scenario where a network device manager (NDM) acts as a maintenance agent for a plurality of printing devices, according to an example embodiment.
Figure 4:
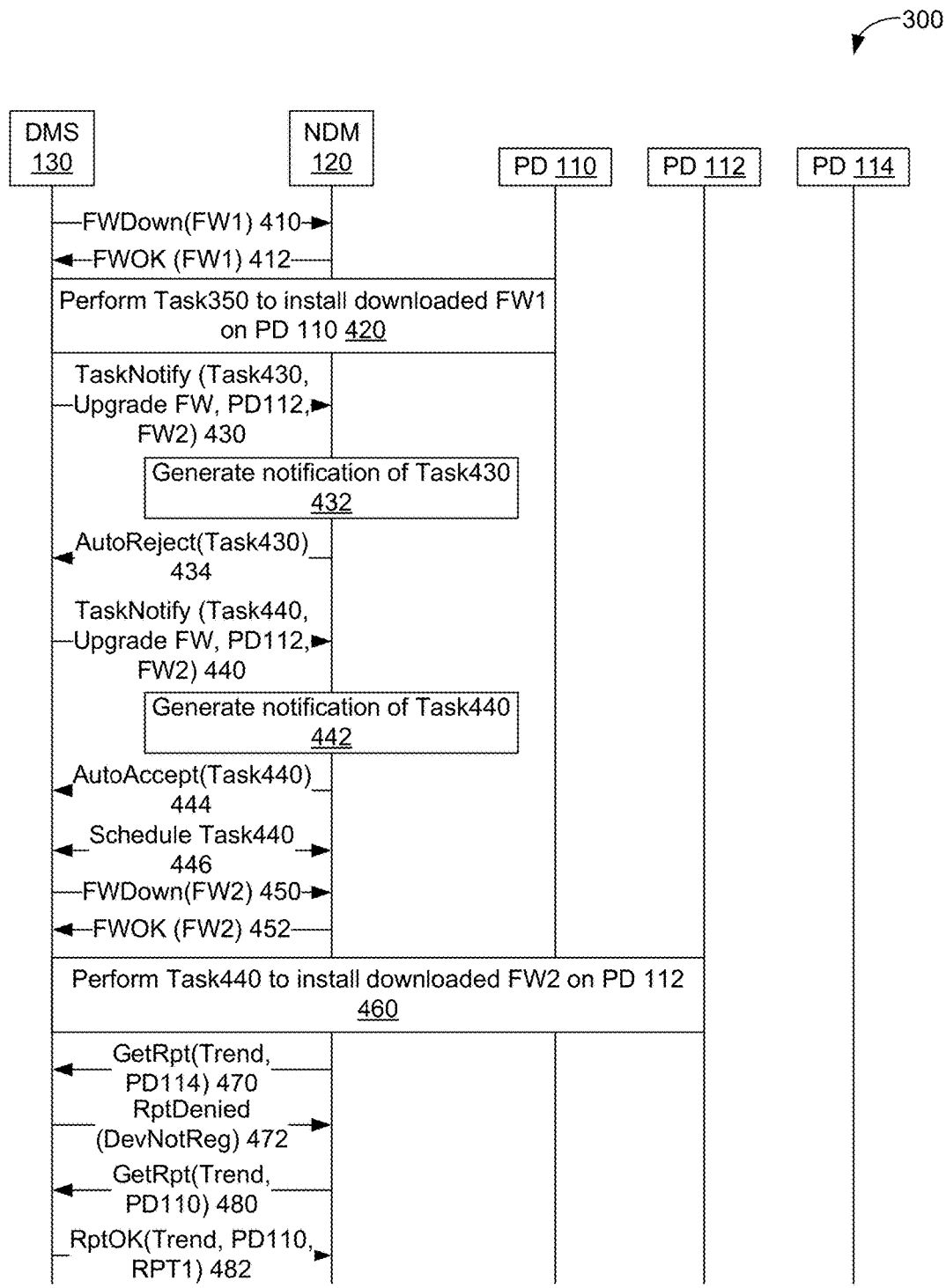
Figure 5:
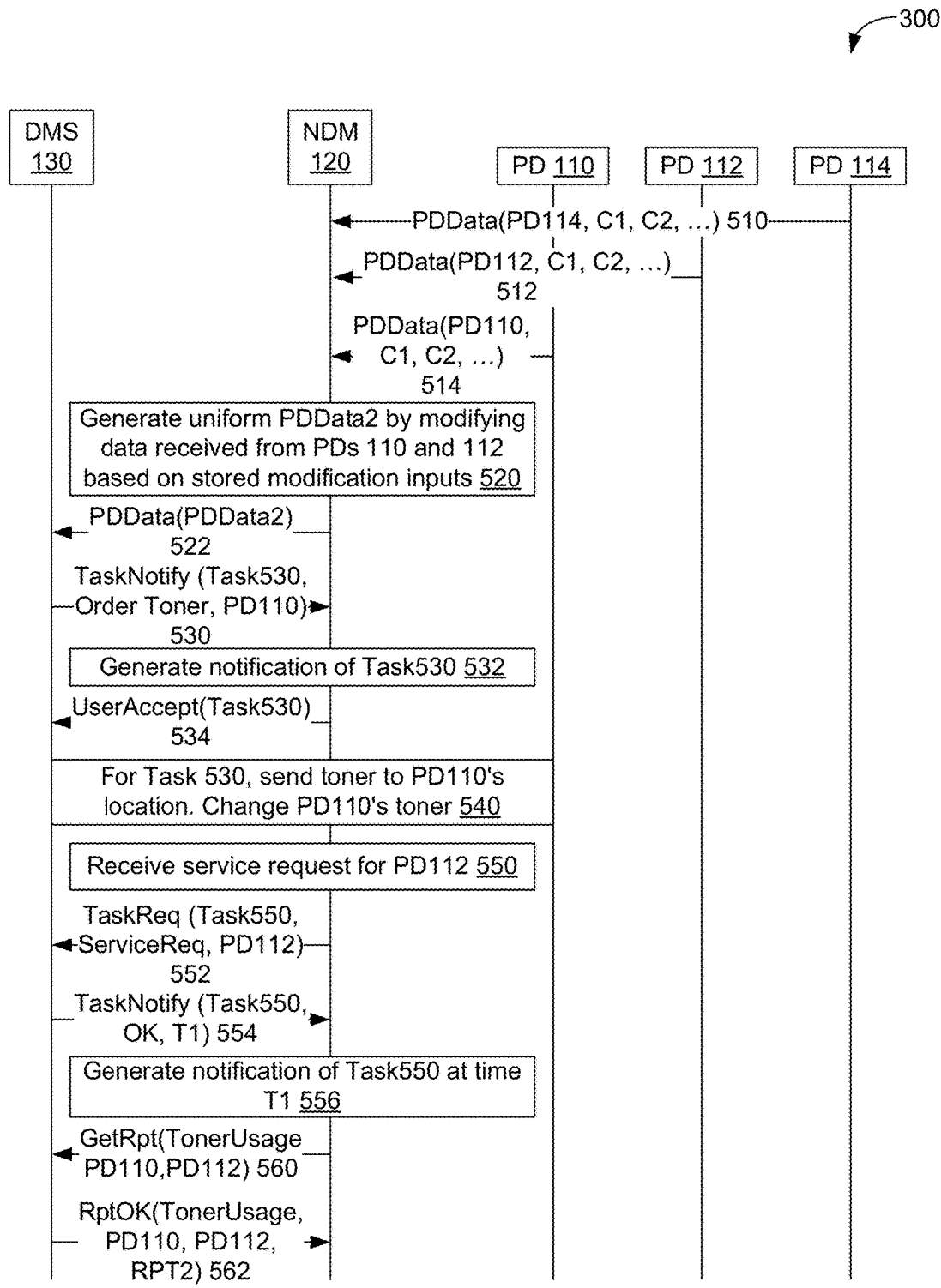

FIGS. 3, 4, and 5 illustrate communications of scenario 300 where NDM 120 acts as a maintenance agent for a plurality of printing devices, according to an example embodiment. In scenario 300, three printing devices 110, 112, 114 are connected to NDM 120 via a local maintenance network, and NDM 120 is connected to device management system 130 via a global maintenance network. At the onset of scenario 300, NDM 120 registers with device management system 130 as a maintenance agent for devices in local maintenance network 170 and printing devices 110 and 112 also register with NDM computing device 120 as a maintenance agent for devices in global maintenance network 160. Then, printing devices 110, 112, 114 provide first printing device data to NDM 120. Upon reception of the first printing device data, NDM 120 modifies the first printing device data received from printing devices 110, 112 for uniformity and provides the modified data to device management system 130.

Scenario 300 continues with device management system 130 sending a first task notification regarding firmware upgrades to NDM 120, and NDM 120 accepting and scheduling a first firmware installation task. Firmware is then downloaded from device management system 130 to NDM 120 and the first firmware installation task is carried out using NDM 120 to install the downloaded firmware onto printing device 110. A second task notification regarding firmware upgrades is sent from device management system 130 to NDM 120, and the second task notification is rejected by NDM 120. Then, a third task notification regarding firmware upgrades is sent from device management system 130 to NDM 120, and the third task notification is accepted by NDM 120. After acceptance, NDM 120 schedules a second firmware installation task, receives firmware for the second firmware installation task from device management system 130, and carries out the second firmware installation task to upgrade firmware on printing device 112.

Scenario 300 proceeds with NDM 120 requesting a report from device management system 130 about printing device 114 and device management system 130 rejecting the request as printing device 114 is not registered with device management system 130. NDM 120 then requests a report from device management system 130 about printing device 110 and device management system 130 generates and sends the report about printing device 110 to NDM 120. Scenario 300 progresses with printing devices 110, 112, 114 providing second printing device data to NDM 120. Upon reception of the second printing device data, NDM 120 modifies the second printing device data received from printing devices 110, 112 for uniformity and provides the modified data to device management system 130.

Scenario 300 continues with device management system 130 sending a fourth task notification regarding toner replacement for printing device 110, and NDM 120 accepting a toner replacement task. After acceptance of the toner replacement task, toner is sent to printing device 110's location and the toner is replaced for printing device 110. Scenario 300 proceeds with NDM 120 receiving a service request for printing device 112. Then, NDM 120 coordinates with device management system 130 to carry out a task for the service request. Scenario 300 concludes with NDM 120 requesting a toner usage report for printing devices 110 and 112 from device management system 130, and device management system 130 subsequently generates and sends the requested toner usage report to NDM 120.

As shown in FIG. 3, scenario 300 begins with NDM 120 sending RegAgent message 310 to device management system 130 to register as a maintenance agent for devices in local maintenance network 170. In response to RegAgent message 310, device management system 130 sends RegAgentOK message 312 accepting the registration of NDM 120 as a maintenance agent.

NDM 120 then sends RegPD message 320 to device management system 130 to register printing device 110 using NDM 120, so that NDM 120 can be used as a maintenance agent for printing device 110 regarding devices in global maintenance network 160; e.g., device management system 130 and any affiliated devices. In response to RegPD message 320, device management system 130 sends RegPDOK message 322 to NDM 120 to indicate that printing device 110 has been registered with device management system 130 using NDM 120 as a maintenance agent. NDM 120 then sends RegPD message 324 to device management system 130 to register printing device 112 regarding devices in global maintenance network 160. In response to RegPD message 324, device management system 130 sends RegPDOK message 326 to NDM 120 to indicate that printing device 112 has been registered with device management system 130 using NDM 120 as a maintenance agent.

The effect of messages 310, 312, 320, 322, 324, 326 is to register NDM 120 as a maintenance agent with device management system 130 for printing devices 110 and 112 in local maintenance network 170. However, NDM 120 has not been registered as a maintenance agent for printing device 114.

Scenario 300 continues with printing devices 114, 112, 110 sending respective PDData messages 330, 332, 334 to NDM 120. Each of PDData messages 330, 332, 334 includes an identifier of the printing device providing data and usage data for the printing device and related counters representing the usage data. For example, FIG. 3 shows that PDData message 330 includes an identifier for "PD114"; that is, printing device 114, and also includes usage data as counters "C1, C2 . . . ".

Upon reception of PDData messages 330, 332, 334 at NDM 120, NDM 120 can perform the procedures of block 340 to generate printing device data PDData1 by modifying the usage data received in PDData messages 330, 332 from respective registered printing devices 110, 112 for uniformity. Modification of data by an NDM is discussed in more detail below at least with respect to FIGS. 6 and 11. The generated uniform usage data PDData1 does not include data for printing device 114, as NDM 120 is not registered as a maintenance agent for printing device 114 and therefore is not authorized to provide data about printing device 114 to device management system 130 and/or other devices in global maintenance network 160. Selectively registering NDM 120 as a maintenance agent for some but not all devices in local maintenance network 170 can be used to enable selective transmission of usage data from devices in local maintenance network 170 to devices in global maintenance network 160.

Upon generation of uniform usage data PDData1, NDM 120 sends the generated data PDData1 to device management system 130 using PDData message 342. In scenario 300, device management system 130 does not send acknowledgements for PDData messages; while in other scenarios, device management system 130 does send acknowledgements for PDData messages.

Scenario 300 continues with device management system 130 sending TaskNotify message 350 regarding a "Task350" to "Upgrade FW"; that is, upgrade firmware, for "PD110" with firmware "FW1" to NDM 120. Upon reception of TaskNotify message 350, NDM 120 uses the procedures of block 352 to generate a notification of Task350 to one or more entities associated with NDM 120; e.g., users of NDM 120 such as IT staff, automated task management systems, etc. The notification of Task350 can include generating a display and/or a printout related to Task350, forwarding on Task350 to one or more entities, and/or sending one or more electronic messages (e.g., e-mails, text messages, social media messages) regarding Task350 to one or more entities, and/or otherwise notifying one or more entities about Task350.

In scenario 300, NDM 120 is configured to automatically accept tasks associated with firmware upgrades for registered printing devices that occur within designated maintenance windows of time and to automatically reject tasks associated with firmware upgrades for registered printing devices that are scheduled to occur outside of designated maintenance windows of time. In particular, Task350 is a task for registered printing device 110 that occurs within a designated maintenance window. As such, NDM 120 is authorized to automatically accept Task350 using AutoAccept message 354. Then, NDM 120 and device management system 130 communicate to schedule 360 Task350 during the designated maintenance window.

Turning to FIG. 4, scenario 300 continues with device management system 130 sending FWDown message 410 to NDM 120 to download firmware "FW1" associated with Task350. Upon reception of FWDown message 410, NDM 120 can retrieve firmware FW1 and verify that FW1 is a firmware upgrade for registered printing device 110 as specified in printer configuration data. For example, NDM 120 can retrieve printer configuration data for printing device 110 and use the retrieved printer configuration data to determine that FW1 is an appropriate firmware upgrade for a printing device manufactured by the manufacturer of registered printing device 110, that FW1 is a firmware upgrade for the same model of printing device as the model of registered printing device 110, and that FW1 is a firmware upgrade for one or more components that are actual components of registered printing device 110.

In some cases, a specification type of registered printing device, such as a type based on manufacturer and model of printing device, can be determined using the printer configuration data for a printing device. Then, as discussed immediately above, specification type data retrieved from printer configuration data can be used to verify that a received firmware package is appropriate for installation on the printing device specified in a task for installing the received firmware package; e.g., the specification type data including model and manufacture data can be used to verify that FW1 is an appropriate firmware upgrade for printing device 110 specified in Task 350. In some cases, NDM 120 can use additional techniques to verify that FW1 is an appropriate firmware upgrade for printing device 110; e.g., check size data for FW1, verify one or more checksums of FW1, ensure FW1 is sent from an authorized IP address, such as an IP address associated with device management system 130, etc.

After verifying firmware package FW1 is an appropriate firmware upgrade for printing device 110, NDM 120 can send FWOK message 412 to device management system 130 to indicate acceptance of firmware FW1. NDM 120 and device management system 130 perform the procedures of block 420 to carry out Task350 and install downloaded firmware FW1 onto printing device 110. In scenario 100, Task350 is carried out successfully using the procedures of block 420 to upgrade firmware of printing device 110 using firmware FW1.

Scenario 300 proceeds with device management system 130 sending TaskNotify message 430 regarding a "Task430" to upgrade firmware, for "PD112" with firmware "FW2" to NDM 120. Upon reception of TaskNotify message 430, NDM 120 uses the procedures of block 432 to generate a notification of Task430 to one or more entities associated with NDM 120 using the procedures discussed above in the context of Task350 and block 352. In scenario 300, Task430 is a task for registered printing device 112 that occurs outside of a designated maintenance window. As such, NDM 120 is authorized to automatically reject Task430 using AutoReject message 434.

Upon reception of AutoReject message 434, device management system 130 sends TaskNotify message 440 regarding a "Task440" to upgrade firmware, for "PD112" with firmware "FW2" to NDM 120. Upon reception of TaskNotify message 430, NDM 120 uses the procedures of block 442 to generate a notification of Task440 to one or more entities associated with NDM 120 using the procedures discussed above in the context of Task350 and block 352.

In scenario 300, Task440 is a task for registered printing device 112 that occurs during of a designated maintenance window. As such, NDM 120 is authorized to automatically accept Task440 using AutoAccept message 444. Then, NDM 120 and device management system 130 communicate to schedule 446 Task440 during the designated maintenance window. After scheduling Task440, device management system 130 sends FWDown message 450 to NDM 120 to download firmware "FW2" associated with Task440.

Upon reception of FWDown message 450, NDM 120 can verify that FW2 is an appropriate firmware upgrade for printing device 112 associated with Task440, using similar techniques to those discussed for printing device 112 and FWOK message 412. After verifying that FW2 is an appropriate firmware upgrade for printing device 112, NDM 120 sends FWOK message 452 to device management system 130. NDM 120 and device management system 130 perform the procedures of block 460 to carry out Task440 and install downloaded firmware FW2 onto printing device 112. In scenario 100, Task440 is carried out successfully using the procedures of block 460 to upgrade firmware of printing device 112 using firmware FW2.

Scenario 300 proceeds with NDM 120 sending GetRpt message 470 to device management system 130 to request a "Trend" report about "PD114". Device management system 130 responds to GetRpt message 472 by sending RptDenied message 472 rejecting the request as printing device 114 is not registered with device management system 130. NDM 120 then sends GetRpt message 480 to device management system 130 to request a "Trend" report about "PD110". Device management system 130 responds to GetRpt message 472 by sending RptOK message 480 with report "RPT1" that includes the requested trend report for printing device 110.

Turning to FIG. 5, scenario 300 progresses with printing devices 114, 112, 110 sending respective PDData messages 510, 512, 514 to NDM 120. Each of PDData messages 510, 512, 514 includes an identifier of the printing device providing data and usage data for the printing device and related counters representing the usage data. For example, FIG. 5 shows that PDData message 512 includes an identifier for "PD112"; that is, printing device 112, and also includes usage data as counters "C1, C2 . . . ".

Upon reception of PDData messages 510, 512, 514 at NDM 120, NDM 120 can perform the procedures of block 520 to generate printing device data PDData2 by modifying the usage data received in PDData messages 510, 512 from respective registered printing devices 110, 112 for uniformity. Modification of data by an NDM is discussed in more detail below at least with respect to FIGS. 6 and 11. The generated uniform usage data PDData2 does not include data for printing device 114, as NDM 120 is not registered as a maintenance agent for printing device 114 as discussed above in the context of printing device data PDData1. Upon generation of uniform usage data PDData2, NDM 120 sends the generated data PDData2 to device management system 130 using PDData message 522.

Scenario 300 continues with device management system 130 sending TaskNotify message 530 for task "Task530" about "Order[ing] Toner" for "PD110"; that is, Task530 regards toner replacement for printing device 110. Upon reception of TaskNotify message 530, NDM 120 uses the procedures of block 532 to generate a notification of Task530 to one or more entities associated with NDM 120 using the procedures discussed above in the context of Task350 and block 352. In scenario 300, a user of NDM 120 observes the notification of Task530 and accepts the task, causing NDM 120 to send UserAccept message 534 to device management system 130 to indicate a user's acceptance of Task530. At block 540, Task530 is carried out by having toner for printing device 110 sent to printing device 110's location and then having the toner for printing device 110 changed.

Scenario 300 proceeds with NDM 120 receiving a service request from a user of NDM 120. Then, NDM 120 sends ServiceReq message 552 to send Task550 requesting service for printing device 112 from service personnel associated with device management system 130. After reception of ServiceReq message 552, device management system 130 sends TaskNotify message 554 to indicate acceptance of Task550 by the service personnel and that the requested service of printing device 112 is scheduled for time T1. Upon reception of TaskNotify message 554, NDM 120 uses the procedures of block 556 to generate a notification of Task550 regarding service of printing device 112 at time T1 to one or more entities associated with NDM 120 using the procedures discussed above in the context of Task350 and block 352.

NDM 120 then sends GetRpt message 560 to device management system 130 to request a "TonerUsage" report about printing devices "PD110" and "PD112". Device management system 130 responds to GetRpt message 560 by sending RptOK message 562 with report "RPT2" that includes the requested toner usage report for printing devices 110 and 112. After transmission of RptOK message 562 from device management system 130, scenario 300 can be completed.

Figure 6:
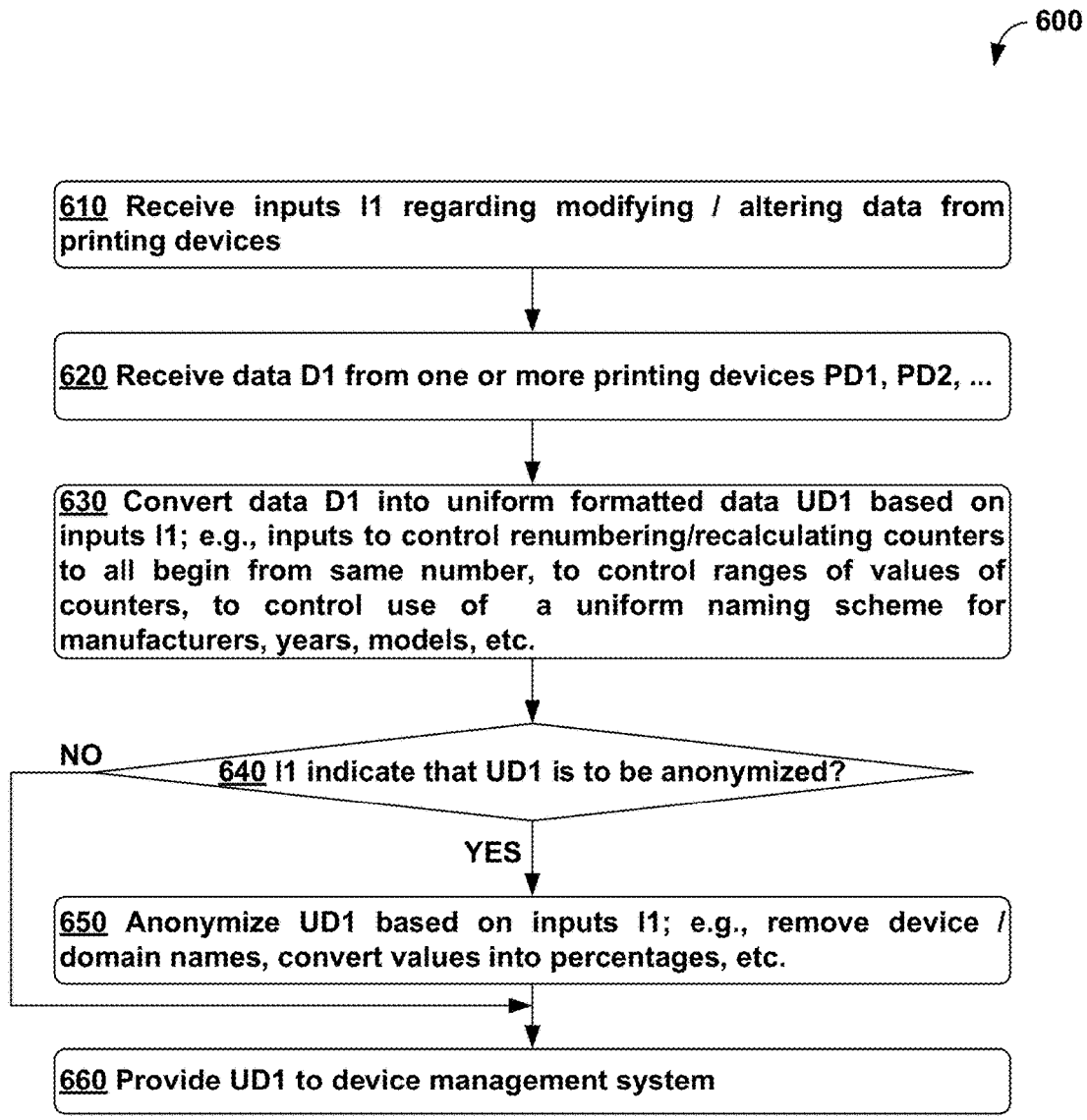
FIG. 6 is a flowchart of a method, according to an example embodiment.

FIG. 6 is a flowchart of method 600, according to an example embodiment. Method 600 can be carried out by a computing device acting as an NDM, such as NDM 120. Method 600 begins at block 610, where the NDM can receive inputs I1 regarding modifying/altering data from printing devices. Inputs I1 can be provided to the NDM using a user interface, such as user interface (UI) 700 discussed below. Examples of inputs I1 can include, but are not limited to, inputs specifying uniformity of data (e.g., specifying particular data to be provided and/or collected for all devices registered with the NDM, specifying default values for missing/inconsistent/out-of-range data fields, specifying consistent ranges of data values and/or data for renumbering/recalculating counters for consistency, specifying a uniform naming scheme for manufacturers, years, models, and other inputs specifying lengths and types of data fields, etc.), inputs specifying data to be communicated or not to be communicated outside of a local maintenance network, and inputs specifying whether anonymization of data is to be performed (e.g., inputs specifying the use or withholding of partial, scrambled, or default device names, network addresses, domain names, locations, etc.).

At block 620, the NDM can receive data D1 from one or more printing devices PD1, PD2 . . . . For example, data D1 can include usage data and/or counters from one or more printing devices, such as discussed above in the context of scenario 300. Other data can be part of D1 as well.

At block 630, the NDM can convert data D1 into uniform formatted data UD1 based on inputs I1. Examples of inputs I1 that are for specifying uniformity of data are discussed above at least in the context of block 610 and below at least in the context of user interface 700. In some examples, uniform formatted data UD1 includes data from only printing (and other) devices that have registered the NDM as a maintenance agent; that is, data from non-registered printing (and other) devices is not included in UD1.

At block 640, the NDM can determine whether inputs I1 indicate that uniform formatted data UD1 is to be anonymized. If inputs I1 indicate that uniform formatted data UD1 is to be anonymized, then the NDM can proceed to block 650. Otherwise, inputs I1 indicate that uniform formatted data UD1 is not to be anonymized, and the NDM can proceed to block 660.

At block 650, the NDM can anonymize uniform formatted data UD1 based on inputs I1. Examples of inputs I1 for specifying whether anonymization of data is to be performed are discussed above at least in the context of block 610 and below at least in the context of user interface 700.

At block 660, the NDM can provide uniform formatted data UD1, which may be anonymized, to a device management system, such as device management system 130. Upon completing of the procedures of block 660, method 600 can be completed.

FIGS. 7, 8, 9, 10, and 11 show displays of a user interface 700 related to a network device manager and a device management service. User interface 700 can be provided by an NDM, such as NDM 120, to generate displays, such as displays 710, 750, 810, 850, 910, 950, 1010, 1050, and 1110 shown in FIGS. 7-11 to enable entry and use of data for the NDM.

Display 710 can be used to provide inputs for registering the NDM as a maintenance agent with the device management system (or other device in global maintenance network 160). These inputs can include: agent path/Uniform Resource Locator (URL) 720, access code 724, description 726, require manager authentication control 730, manager user name 732, and manager password 734. Agent path/URL input 720 can be an input for providing information to address and/or locate the device management system (or other device in global maintenance network 160) from the NDM. Gateway ID 722 can be a display of a identifier of the device management system that is generated by the NDM to help a user of display 710 determine a specific device management system (or other device in global maintenance network 160) addressed and/or located by agent path/URL input 720. Access code 724 can be an input that is provided to a device management system (or other device in global maintenance network 160) specified by agent path/URL input 720 to connect with and/or otherwise access that device. In other examples, more, fewer, and/or different inputs and/or user interface controls can be provided using display 710.

Description 726 can be an input that provides information about the device management system for identification, naming, and/or other purposes. Require manager authentication control 730 can be selected or not selected—FIG. 7 shows require manager authentication control 730 with an "X" indicating selection. When selected, require manager authentication control 730 indicates that manager user name 732 and manager password 734 can be provided to the device management system to log on to the device management system and act as a maintenance agent. If require manager authentication control 730 is not selected, that manager user name 732 and manager password 734 are not provided to the device management system.

Display 710 also includes register button 736, unregister button 738, and cancel button 740. Register button 736 can be selected to register the NDM with the device management system specified by agent path/URL input 720. Unregister button 738 can be selected to delete registration of NDM or "unregister" with the device management system specified by agent path/URL input 720. Cancel button 740 can be selected to exit from display 710.

Display 750 can be used to provide inputs for proxy data for connecting the NDM to the device management system (or other device in global maintenance network 160) via a proxy. These inputs can include: use proxy control 760, host name 770, port 772, proxy username 774, and proxy password 776. Use proxy control 760, when selected, indicates that the NDM is to connect to the device management system via a proxy computing device. Host name 770 can be used to specify a name of the proxy computing device, port 772 can be used to specify a port number for connecting to the proxy computing device, proxy username 774 can be used to specify a user name utilized for connecting to the proxy computing device, and proxy password 776 can be used to specify a password that is provided with the proxy username 774 when connecting to the proxy computing device. When use proxy control 760 is not selected, then the NDM is to connect to the device management system without a proxy; i.e., a direct connection between the NDM and device management system, perhaps directly connecting to the device specified using agent path/URL 720 of display 710, is to be used. In other examples, more, fewer, and/or different inputs and/or user interface controls can be provided using display 750.

Display 750 also includes save button 780, delete button 782, and cancel button 784. Save button 780 can be selected to save the proxy data provided using display 750 for the NDM. Delete button 782 can be selected to delete the proxy data displayed using display 750 for the NDM. Cancel button 784 can be selected to exit from display 750.

Turning to FIG. 8, display 810 shows a printer device list provided by user interface 700. The printer device list includes information about printing devices connected to the NDM via the local maintenance network and/or administered by the NDM. In the example shown in FIG. 8, display 810 shows a listing of eight printing devices. For each printing device, a "Status", a "Model Name", an "IP Addr[ess]", a "Host Name", a "Toner" percentage, and additional "Info" are provided by display 810. For example, a first printing device in the printer device list has a status of "Ready", a model name of "ECOSYS xxx", an IP address of "xx.xx.xx.xx", a host name of "NM103302", a toner percentage of "88%", and additional information of "Kyocera1". In other examples, display 810 provides more, less, and/or different information about printing devices in the printer device list.

Display 810 allows selection of a printer in the printer device list. FIG. 8 shows that a last printing device in the printer device list has been selected as selection 820—the selected printing device has a status of "Ready", a model name of "FS-xxxxMFP", an IP address of "xx.xx.zz.yy", a host name of "NM303222", a toner percentage of "14%", and additional information of "Kyocera112". A visual and/or other indication of the selection of a printing device can be generated by user interface 700—in this example, data for the selected last printing device is shown using white text on a black background of display 810, while data for the non-selected printing devices are shown using black text on a white background of display 810, thus providing a visual indication of the selection of the last printing device of the printer display list of display 810.

In some cases, selection of a printing device in the printer device list can enable a user to choose from one or more additional operations related to the selected printing device using user interface 700; e.g., after pressing a right button of a computer mouse or use of another user interface control mechanism for a selected printing device. For example, FIG. 8 shows that selection of the last printing device as selection 820 enables presentation of pull down 830. Pull down 830 provides additional operations related to the selected printing device, including a "Test Print on Kyocera112", "Power[ing] Down Kyocera112", "Diagnos[ing] Kyocera112", and "Register[ing] Kyocera112 with DMS". FIG. 8 shows that the "Register Kyocera112 with DMS" selection of pull down 830 has been chosen, as visually indicated using a black background and white text on pull down 830. In other examples, display 810 has more, fewer, and/or different controls; e.g., an "Exit" button to close display 810.

After user interface 700 receives the choice of "Register Kyocera112 with DMS" selection of pull down 830, user interface 700 can generate display 850 to register a particular printing device; e.g., the printing device "Kyocera112", with a device management system. Display 850 can be used to provide inputs for registering a particular printing device with a device management system. Display 850 includes title bar 852 indicating that, for this example, the particular printing device is the selected printing device "Kyocera112" mentioned above with respect to display 810. Display 850 can provide inputs that include: direct control 860, gateway control 862, register now control 870, and register later control 872. In other examples, user interface 700 can provide other and/or additional techniques to reach display 850 than via pull down 830.

Direct control 860 and gateway control 862, in combination, can specify how the particular printing device is registered with the device management system. Direct control 860, if selected, can indicate that the particular printing device is registered with the device management system without use of a maintenance agent; e.g., the NDM. In contrast, gateway control 862, if selected, can indicate that the maintenance agent has been registered with the device management system to operate on behalf of the particular printing device. In some examples, the NDM has not been registered with the device management system to act as a maintenance agent. Then, selection of gateway control 862 will lead to the registration of a non-existent maintenance agent for the particular printing device—to avoid this situation, display 850 provides a user warning that reads "[t]his program [the NDM] must be registered as Gateway Agent for this option. Verify Gateway Agent settings before proceeding", where the "Gateway Agent settings" can be provided using user interface 700; e.g., via display 710.

Register now control 870 and register later control 872, in combination, can specify a time for registration of the particular printing device with the device management system. If register now control 870 is selected at a time when save button 880 is selected, initiation of the registration of the maintenance agent and/or particular printing device with the device management system will commence upon selection of save button 880. If register later control 872 is selected at a time when save button 880 is selected, user interface 700 will provide controls for specifying a future time and/or a future date for registration of the particular printing device with the device management system.

Display 850 also includes save button 880 and cancel button 882. Save button 780 can be selected to save the registration data provided using display 850 on the NDM for the particular printing device, and, in some cases, to initiate registration of the maintenance agent and/or particular printing device with the device management system. Cancel button 882 can be selected to exit from display 850.

Turning to FIG. 9, display 910, which is a "DMS Task Management Display", can be used to initiate and display information about tasks scheduled between the NDM and the device management system. In other examples, display 910 can be used for other and/or additional tasks; e.g., tasks to be performed by the NDM that do not involve the device management system.

Display 910 includes fields of data about each task scheduled between the NDM and the device management system, including fields for: a "Task" name, a "Device" associated with the task, a "Time" scheduled for the task, and "Info[rmation]" about the task. For example, a top-most task shown in display 910 is a "FW Upgrade" (i.e., a firmware upgrade) task for a printing device "Kyocera1" scheduled for "Mon[day at] 06:00" with additional information of "Engine, Scanner" indicating that this task is a firmware upgrade for a printer engine and scanner components of the Kyocera1 printing device. Display 910 allows displayed tasks to be sorted in various orders; in the example shown in FIG. 9, three tasks are shown sorted by time, as indicated by sort indicator 912 being displayed next to the "Time" field. More, fewer, and/or different example tasks, sorting orders, fields of data, and/or user interface controls can be provided by display 910.

Display 910 also includes generate new task button 920 and exit button 922. Generate new task button 920 can be selected to generate a new task to be task scheduled between the NDM and the device management system. Exit button 922 can be selected to exit from display 850.

In the example shown in FIG. 9, generate new task button 920 is selected and NDM responsively provides display 950 to "Generate a New DMS Task". Display 950 can be used to provide inputs for generating and sending a new task to the device management system. Display 950 includes fields of data for providing inputs regarding one or more device names 960, task 970, and description 980.

Device name(s) field 960 can be used to provide a name or otherwise identify one or more devices in the local maintenance network associated with the task. Task 970 can be used to provide information about a type of task to be generated. In the example shown in FIG. 9, pull down menu 972 includes three types of tasks that can be generated: a "FW Upgrade" task for upgrading firmware, a "Diagnose" task to diagnose, investigate, and hopefully resolve a problem with the one or more devices identified by device name(s) field 960, and an "Other" task that can be described using description field 980. For example, if the task involves configuring one or more device settings for the one or more devices identified by device name(s) field 960, then the description field 980 can include information such as "Configure device settings XX and YY for the device". In the specific example shown in FIG. 9, device name(s) field 960 identifies a device "Kyocera27", task field 970 indicates a "FW upgrade" task, and description field 980 is blank, indicating the task shown in FIG. 9 involves a firmware upgrade of a printing device identified as Kyocera27. In other examples, more, fewer, and/or different fields of data and/or user interface controls can be utilized by display 950; e.g., other device name(s), types of tasks, descriptions, and/or other data related to device management system tasks are possible as well.

Display 950 also includes send task button 990 and cancel button 992. Send task button 990 can be selected to generate and send a new task that is based on the data in device name(s) field 960, task 970, and description 980 to the device management system so that the new task can be scheduled between the NDM and the device management system and subsequently carried out for devices listed using device name(s) field 960. Exit button 992 can be selected to exit from display 950 without generating or sending a new device management system task to the device management system.

Turning to FIG. 10, display 1010 can be used to provide inputs related to printer configuration data. These inputs can include: device name field 1020, manufacturer field 1022, model field 1024, year field 1026, firmware version field 1028, and components field 1030. In some examples, printer configuration data can be used to determine one or more specification types of one or more printing devices. A specification type can include device name, manufacturer, year, firmware versioning, and other information that specifies a printing device. The specification type and/or printer configuration data can be used in verifying and/or enabling installation of firmware packages for registered printing devices, such as discussed above in the context of scenario 300.

Device name field 1020 can be used to provide a device name to identify a printing device. The device name can one or more alphanumeric characters that can be used to uniquely identify the printing device and thus can as a key for printer configuration data and/or other data associated with the printing device; e.g., data about tasks associated with the printing device. Manufacturer field 1022 can be used to provide input specifying a manufacturer of the printing device; e.g., Kyocera, HP, Okidata, Canon. Model field 1024 can be used to provide input specifying a model name and/or number of the printing device.

Year field 1026 can be used provide a year of manufacture of the printing device. Firmware version field 1028 can be used to provide input about firmware used by the printing device, including one or more firmware version identifiers, times/dates of firmware installation, and/or other data related to firmware of the printing device. Components field 1030 can be used to provide input about one or more parts or components of the printing device—for example, input regarding whether or not the printing device has a printer engine, a scanner, a copier, and/or a finisher (e.g., stapler and/or page collation device).

The example shown in FIG. 10 illustrates printer configuration data for a printing device having a device name is "Kyocera27" and a model name of "xxxx", which is a printing device manufactured by "Kyocera" in year "2017" having a current firmware version of "FWxxxxxx", and where the printing device includes a printer engine and a scanner but does not include a copier or finisher.

Display 1010 also includes save button 1040 and cancel button 1042. Save button 1040 can be selected to save the printer configuration data shown in display 1010. Cancel button 1042 can be selected to exit from display 1010 without saving the printer configuration data shown in display 1010. In other examples, more, fewer, and/or different inputs and/or user interface controls can be provided by display 1010.

Display 1050 can be used to provide inputs for task configuration data for tasks associated with the device management system. The task configuration data can be used to determine whether the NDM automatically accepts and/or rejects task requests from the device management system. These inputs for task configuration data can include automatic firmware acceptance controls 1060, automatic time acceptance fields 1070, and automatic time rejection control 1072. Automatic firmware acceptance controls 1060 can be used to automatically accept some or all device management system tasks associated with firmware upgrades. Automatic time acceptance fields 1070 can be used to specify one or more times during a week that device management system tasks will be automatically accepted. Automatic time rejection control 1072, when selected, instructs the NDM to automatically reject a task scheduled outside of a time where the task would be automatically accepted; that is, when automatic time acceptance fields 1070 are provided and automatic time rejection control 1072, all tasks associated with the device management system will be either automatically accepted or automatically rejected based on scheduled times of the tasks.

In the example shown in FIG. 10, the task configuration data indicates that tasks with the device management system will be automatically accepted for firmware upgrades associated with "Security" but will not be automatically accepted for firmware upgrades associated with a "Printer Engine", a "Scanner", a "Copier", or a "Finisher". Also, tasks with the device management system will be automatically accepted during the times of "0000-0559, 2200-2359" during "Monday[s]", "Tuesday[s]", "Wednesday[s]", "Thursday[s]", and "Friday[s]", but will not be automatically accepted on other times during the week. Also, tasks with the device management system that fall outside for task acceptance times specified by time acceptance fields 1070 will not be automatically rejected.

Display 1050 also includes save button 1080 and cancel button 1082. Save button 1080 can be selected to save the task configuration data shown in display 1050. Cancel button 1082 can be selected to exit from display 1050 without saving the task configuration data. In other examples, more, fewer, and/or different inputs and/or user interface controls related to task configuration data can be provided by display 1050.

Figure 11:
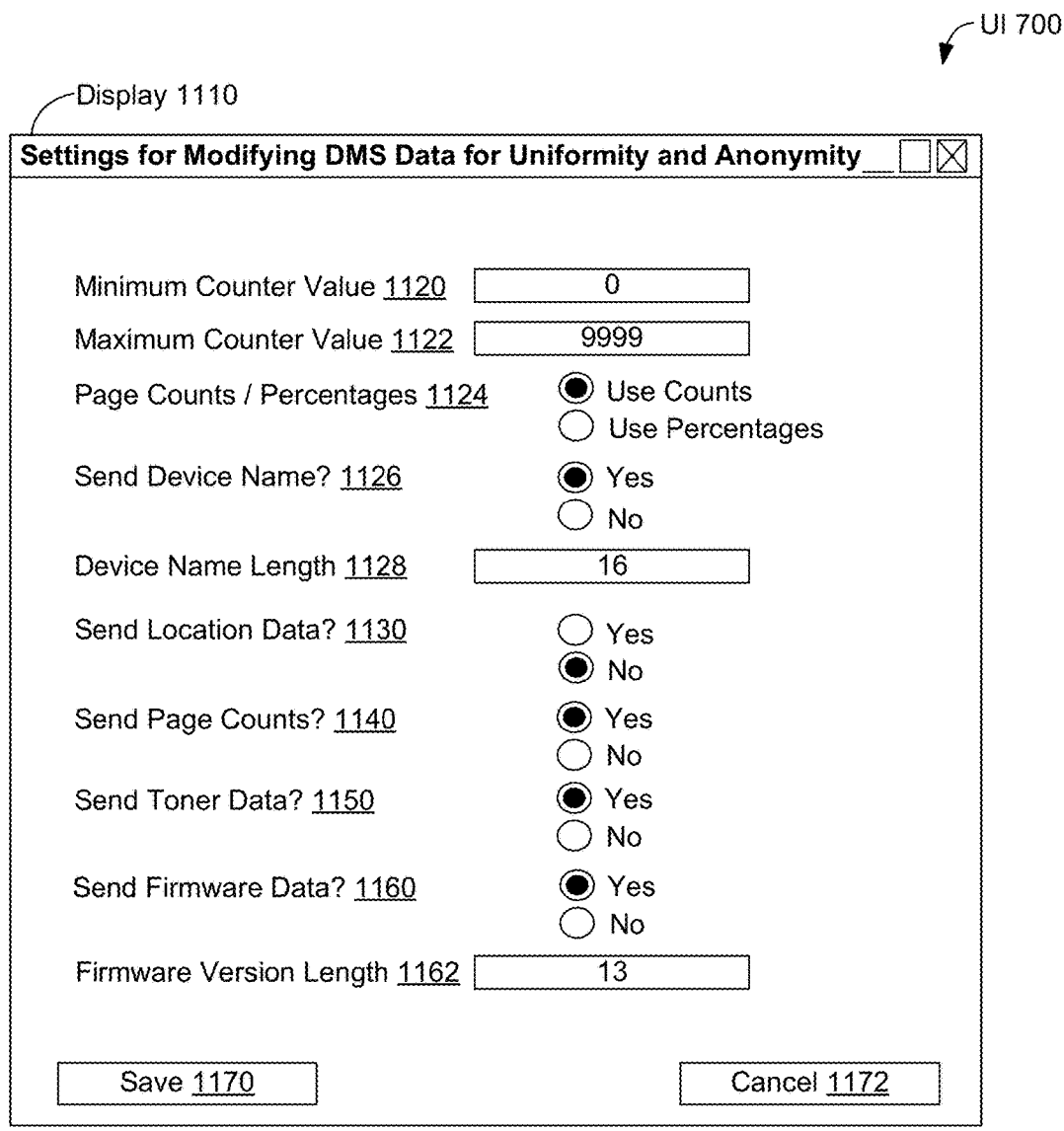

Turning to FIG. 11, display 1110 can be used to provide inputs for settings for modifying data communicated to the device management system. For example, the settings/inputs selected using display 1110 can be used to control information provided to the device management system by the NDM for printing devices that have registered the NDM as a maintenance agent for the device management system. That is, when the NDM sends data about one or more registered printing devices to the device management system, the NDM can use the settings/inputs of display 1110 to determine how the data about one or more registered printing devices is to be selected, formatted, anonymized, and/or provided to the device management system.

Display 1110 includes fields of data and controls for settings/inputs for modifying (i.e., selecting, formatting, and/or anonymizing) data about one or more registered printing devices. These fields include minimum counter value field 1120, maximum counter value field 1122, page counts/percentage control 1124, send device name control 1126, device name length field 1128, send location data control 1130, send page counts control 1140, send toner data control 1150, send firmware data control 1160, and firmware version length field 1162.

Minimum counter value field 1120 and maximum counter value field 1122 can be used to specify respective minimum and maximum counter value for one or more counters provided as usage (or other) data from the DMS to the device management system. These counters can include, but are not limited to, printed page counters, copied page counters, scanned page counters, and counters associated with printing device usage over a period of time (e.g., one or more daily, weekly, monthly, and/or annual printed, scanned, and/or copied page counters). Minimum counter value field 1120 and maximum counter value field 1122 can be used to ensure uniformity of data sent to the device management system; i.e., by ensuring that all counter values fall between the specified minimum and maximum counter values.

Page counts/percentage control 1124 can be used to select whether page counts or corresponding page percentages are sent from the DMS to the device management system. Page percentages can be sent as part of anonymizing data, as providing a page percentage rather than a page count hides or anonymizes specific page counts from the device management system. Also, sending either page counts or percentages can be used to ensure that either counts or percentages are used uniformly in data sent to the device management system.

Send device name control 1126 can be used to select whether or not a device name for a printing device is sent from the DMS to the device management system. If a device name is not sent for a printing device, an appropriate device name replacement can be sent; e.g., a generic name like "Printing Device" or "PD xxxx", where xxxx is set to a numeric or alphanumeric value specific to a printing device. Not sending device names can be used to anonymize a printing device by keeping actual device name information hidden from the device management system.

Device name length field 1128 can be used to specify a maximum length of a device name field provided by the NDM to the device management system, thus ensuring that device names sent to the device management system are uniformly sized to be no longer than the specified device name length. Send location data control 1130 can be used to select whether or not location data for a location of a printing device is sent by the NDM to the device management system. Not sending location data can be used to anonymize a printing device by keeping actual location data hidden from the device management system.

Send page counts control 1140, send toner data control 1150, and send firmware data control 1160 can be used to select what data about registered printing devices is provided by the NDM to the device management system. In particular, send page counts control 1140 can be used to specify whether or not page counts are sent from the NDM to the device management system, send toner data control 1150 can be used to specify whether or not toner data is sent from the NDM to the device management system, and send firmware data control 1160 can be used to specify whether or not firmware-related data is sent from the NDM to the device management system. Firmware version length field 1162 can be used to specify a maximum length of a firmware version information provided by the NDM to the device management system, and thus ensuring that firmware version information sent to the device management system is uniformly sized to be no longer than the specified firmware version length.

Display 1110 also includes save button 1170 and cancel button 1172. Save button 1170 can be selected to save the settings shown in display 1110. Cancel button 1172 can be selected to exit from display 1110 without saving the settings shown in display 1110. In other examples, more, fewer, and/or different fields of data and/or user interface controls can be provided by display 1110. In still other examples, user interface 700 can provide more, fewer, and/or different displays, inputs and/or user interface controls than discussed herein.

IV. Example Methods of Operation

FIG. 12 shows a flowchart for method 1200, according to an example embodiment. Method 1200 can be carried out by a computing device acting as an NDM, such as a NDM 120 and/or computing device 200.

Method 1200 can begin at block 1210, where the NDM can be registered as a maintenance agent for a plurality of printing devices, such as discussed above at least in the context of FIGS. 3 and 8.

At block 1220, the NDM can be utilized as the maintenance agent for the plurality of printing devices by: receiving inputs related to modifying data at the NDM; receiving data from the plurality of printing devices at the NDM; modifying the data received from the plurality of printing devices based on the inputs related to modifying data using the NDM; sending the modified data from the NDM to a device management system; after sending the modified data, receiving, at the NDM from the device management system, one or more maintenance messages related to maintenance of the plurality of printing devices; and providing a notification of the one or more maintenance messages, such as discussed above at least in the context of FIGS. 1A-11.

In some embodiments, the one or more maintenance messages can include a message related to one or more maintenance and management operations for a particular printing device of the plurality of printing devices, and where utilizing the NDM as the maintenance agent further includes performing the one or more maintenance and management operations for the particular printing device using the device management system, such as discussed above at least in the context of FIGS. 3-5 and 9.

In particular of these embodiments, the one or more maintenance and management operations can include one or more of: an operation related to a firmware upgrade for a particular printing device, an operation related to configuring one or more device settings, an operation related to a security certificate, an operation related to restarting the particular printing device, an operation related to powering on the particular printing device, an operation related to powering off the particular printing device, an operation related to managing an address book related to the particular printing device, an operation related to managing one or more user accounts of the particular printing device, an operation utilizing a display panel of the particular printing device, an operation related one or more software extensions and/or applications related to the particular printing device, an operation related to communicating data with the particular printing device, and an operation related to registering the particular printing device for maintenance services, such as discussed above at least in the context of FIGS. 3-5 and 9.

In other embodiments, the NDM can be configured to indicate one or more functional types of firmware upgrades that are enabled for installation on the plurality of printing devices; then, utilizing the NDM as the maintenance agent can further include: indicating enablement of installation of firmware upgrades for a particular functional type of one or more functional types using the device management system; after indicating the enablement of installation of firmware upgrades for the particular functional type, receiving the firmware for the particular printing device at the NDM from the device management system, where the received firmware is of the particular functional type; and installing the received firmware on the particular printing device, such as discussed above at least in the context of FIGS. 3-5 and 10. In particular of these embodiments, the one or more functional types of firmware upgrades can include one or more of: a functional type related to security of a printing device, a functional type related to a printer engine of a printing device, a functional type related to scanning components of a printing device, and a functional type related to copying components of a printing device, such as discussed above at least in the context of FIGS. 3-5 and 10.

In other particular of these embodiments, the NDM can configured to indicate information specifying one or more specification types of printing devices, where the particular printing device is a particular specification type of the one or more specification types of printing devices, and where installing firmware on the particular printing device includes: indicating enablement of installation of firmware upgrades for the particular specification type using the device management system; and after indicating the enablement installation of the particular functional type of firmware upgrade, receiving the firmware for the particular printing device at the NDM from the device management system, where the received firmware is for printing devices having the particular specification type, such as discussed above at least in the context of FIGS. 4 and 10. In more particular embodiments, the one or more specification types can be based on one or more of: a manufacturer of a printing device, a model name of a printing device, a year of manufacture of a printing device, information about firmware installed on a printing device, and information specifying one or more components of a printing device, such as discussed above at least in the context of FIGS. 4 and 10.

In still other embodiments, utilizing the NDM as the maintenance agent can further include: receiving a service request at the NDM, the service request requesting service on one or more of the plurality of printing devices; sending the service request from the NDM to the device management system; and after sending the service request, receiving a task notification at the device management system, the task notification including information related to a task to address the service request, such as discussed above at least in the context of FIGS. 5 and 9.

In even other embodiments, utilizing the NDM as the maintenance agent can further include: sending, from the NDM to the device management system, a report request for one or more reports that are based on the modified data; and after sending the report request, receiving the one or more reports at the NDM, such as discussed above at least in the context of FIGS. 4 and 5. In particular of these embodiments, the one or more reports can include one or more of: a report related to toner replacement of at least one of the plurality of printing devices, a report related to a trend of at least one of the plurality of printing devices, and a report based on historical data about the plurality of printing devices, the historical data including at least part of the modified data, such as discussed above at least in the context of FIGS. 4 and 5.

In further other embodiments, the NDM can be part of a system, such as printing network 100 or printing network 150, that also includes a device management system and a plurality of printing devices. In some of these embodiments, the NDM can be communicatively coupled to the device management system via a first network and can be communicatively coupled to the plurality of printing devices via a second network, and where the device management system is not directly communicatively coupled to the second network, such as discussed above in the context of printing network 150.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    registering a network device manager (NDM) executing on a computing device as a maintenance agent for a plurality of printing devices; and
    utilizing the NDM as the maintenance agent for the plurality of printing devices by:
        receiving inputs related to modifying data at the NDM;
        receiving data from the plurality of printing devices at the NDM;
        modifying the data received from the plurality of printing devices based on the inputs related to modifying data using the NDM;
        sending the modified data from the NDM to a device management system;
        after sending the modified data, receiving, at the NDM from the device management system, one or more maintenance messages related to maintenance of the plurality of printing devices; and
        providing a notification of the one or more maintenance messages.

2. The method of claim 1, wherein the one or more maintenance messages comprise a message related to one or more maintenance and management operations for a particular printing device of the plurality of printing devices, and wherein utilizing the NDM as the maintenance agent further comprises performing the one or more maintenance and management operations for the particular printing device using the device management system.

3. The method of claim 2, wherein the one or more maintenance and management operations include one or more of: an operation related to a firmware upgrade for a particular printing device, an operation related to configuring one or more device settings, an operation related to a security certificate, an operation related to restarting the particular printing device, an operation related to powering on the particular printing device, an operation related to powering off the particular printing device, an operation related to managing an address book related to the particular printing device, an operation related to managing one or more user accounts of the particular printing device, an operation utilizing a display panel of the particular printing device, an operation related one or more software extensions and/or applications related to the particular printing device, an operation related to communicating data with the particular printing device, and an operation related to registering the particular printing device for maintenance services.

4. The method of claim 1, wherein the NDM is configured to indicate one or more functional types of firmware upgrades that are enabled for installation on the plurality of printing devices, and wherein utilizing the NDM as the maintenance agent further comprises:
    indicating enablement of installation of firmware upgrades for a particular functional type of one or more functional types using the device management system;
    after indicating the enablement of installation of firmware upgrades for the particular functional type, receiving the firmware for the particular printing device at the NDM from the device management system, where the received firmware is of the particular functional type; and
    installing the received firmware on the particular printing device.

5. The method of claim 4, wherein the one or more functional types of firmware upgrades comprise one or more of: a functional type related to security of a printing device, a functional type related to a printer engine of a printing device, a functional type related to scanning components of a printing device, and a functional type related to copying components of a printing device.

6. The method of claim 4, wherein the NDM is configured to indicate information specifying one or more specification types of printing devices, wherein the particular printing device is a particular specification type of the one or more specification types of printing devices, and wherein installing firmware on the particular printing device comprises:
    indicating enablement of installation of firmware upgrades for the particular specification type using the device management system; and
    after indicating the enablement installation of the particular functional type of firmware upgrade, receiving the firmware for the particular printing device at the NDM from the device management system, where the received firmware is for printing devices having the particular specification type.

7. The method of claim 6, wherein the one or more specification types are based on one or more of: a manufacturer of a printing device, a model name of a printing device, a year of manufacture of a printing device, information about firmware installed on a printing device, and information specifying one or more components of a printing device.

8. The method of claim 1, wherein utilizing the NDM as the maintenance agent further comprises:
receiving a service request at the NDM, the service request requesting service on one or more of the plurality of printing devices;
sending the service request from the NDM to the device management system; and
after sending the service request, receiving a task notification at the device management system, the task notification comprising information related to a task to address the service request.

9. The method of claim 1, wherein utilizing the NDM as the maintenance agent further comprises:
sending, from the NDM to the device management system, a report request for one or more reports that are based on the modified data; and
after sending the report request, receiving the one or more reports at the NDM.

10. The method of claim 9, wherein the one or more reports include one or more of: a report related to toner replacement of at least one of the plurality of printing devices, a report related to a trend of at least one of the plurality of printing devices, and a report based on historical data about the plurality of printing devices, the historical data including at least part of the modified data.

11. A system, comprising:
a device management system;
a plurality of printing devices; and
a network device manager (NDM), comprising:
one or more processors; and
data storage configured to store computer-readable instructions that, when executed by the one or more processors, cause the computing device to perform tasks comprising:
registering as a maintenance agent for the plurality of printing devices with the device management system; and
utilizing the NDM as the maintenance agent for the plurality of printing devices by:
receiving inputs related to modifying data at the NDM;
receiving data from the plurality of printing devices at the NDM;
modifying the data received from the plurality of printing devices based on the inputs related to modifying data using the NDM;
sending the modified data from the NDM to the device management system;
after sending the modified data, receiving, at the NDM from the device management system, one or more maintenance messages related to maintenance of the plurality of printing devices; and
providing a notification of the one or more maintenance messages.

12. The system of claim 11, wherein the NDM is communicatively coupled to the device management system via a first network and is communicatively coupled to the plurality of printing devices via a second network, and wherein the device management system is not directly communicatively coupled to the second network.

13. The system of claim 11, wherein the one or more maintenance messages comprise a message related to upgrading firmware of a particular printing device of the plurality of printing devices, and wherein utilizing the NDM as the maintenance agent further comprises installing firmware on the particular printing device using the device management system.

14. The system of claim 13, wherein installing firmware on the particular printing device using the NDM comprises:
receiving firmware for the particular printing device at the NDM from the device management system; and
sending the received firmware from the NDM to the particular printing device.

15. The system of claim 13, wherein the NDM is configured to indicate one or more functional types of firmware upgrades that are enabled for installation on the plurality of printing devices, wherein the one or more functional types of firmware upgrades comprise one or more of: a functional type related to security of a printing device, a functional type related to a printer engine of a printing device, a functional type related to scanning components of a printing device, and a functional type related to copying components of a printing device, and
wherein installing firmware on the particular printing device comprises:
indicating enablement of installation of firmware upgrades for a particular functional type of one or more functional types using the device management system; and
after indicating the enablement of installation of firmware upgrades for the particular functional type, receiving the firmware for the particular printing device at the NDM from the device management system, where the received firmware is of the particular functional type.

16. The system of claim 13, wherein the NDM is configured to indicate information specifying one or more specification types of printing devices, wherein the particular printing device is a particular specification type of the one or more specification types of printing devices, wherein the one or more specification types are based on one or more of: a manufacturer of a printing device, a model name of a printing device, a year of manufacture of a printing device, information about firmware installed on a printing device, and information specifying one or more components of a printing device, and
wherein installing firmware on the particular printing device comprises:
indicating enablement of installation of firmware upgrades for the particular specification type using the device management system; and
after indicating the enablement installation of the particular functional type of firmware upgrade, receiving the firmware for the particular printing device at the NDM from the device management system, where the received firmware is for printing devices having the particular specification type.

17. The system of claim 11, wherein utilizing the NDM as the maintenance agent further comprises:
receiving a service request at the device management system, the service request requesting service on one or more of the plurality of printing devices;
sending the service request from the NDM to the device management system; and after sending the service request, receiving a task notification at the device management system, the task notification comprising information related to a task to address the service request.

18. The system of claim 11, wherein utilizing the NDM as the maintenance agent further comprises:
sending, from the NDM to the device management system, a report request for one or more reports that are based on the modified data, wherein the one or more reports include one or more of: a report related to toner replacement of at least one of the plurality of printing devices, a report related to a trend of at least one of the plurality of printing devices, and a report based on historical data about the plurality of printing devices, the historical data including at least part of the modified data; and
after sending the report request, receiving the one or more reports at the NDM.

19. An article of manufacture comprising non-transitory data storage storing at least computer-readable instructions for a network device manager (NDM) that, when executed by one or more processors of a computing device, cause the computing device to perform tasks comprising:
registering as a maintenance agent for a plurality of printing devices with a device management system; and
utilizing the NDM as the maintenance agent for the plurality of printing devices by:
receiving inputs related to modifying data at the NDM;
receiving data from the plurality of printing devices at the NDM;
modifying the data received from the plurality of printing devices based on the inputs related to modifying data using the NDM;
sending the modified data from the NDM to the device management system;
after sending the modified data, receiving, at the NDM from the device management system, one or more maintenance messages related to maintenance of the plurality of printing devices; and
providing a notification of the one or more maintenance messages.

20. The article of manufacture of claim 19, wherein the one or more maintenance messages comprise a message related to upgrading firmware of a particular printing device of the plurality of printing devices, and wherein utilizing the NDM as the maintenance agent further comprises installing firmware on the particular printing device using the device management system.

* * * * *